(12) United States Patent
Cariou et al.

(10) Patent No.: US 10,182,369 B2
(45) Date of Patent: Jan. 15, 2019

(54) FLOW CONTROL WITH ACKNOWLEDGMENT FEEDBACK

(71) Applicant: Intel IP Corporation, Santa Clara, CA (US)

(72) Inventors: Laurent Cariou, Portland, OR (US); Yaron Alpert, Hod Hasharoni (IL); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 157 days.

(21) Appl. No.: 15/197,383

(22) Filed: Jun. 29, 2016

(65) Prior Publication Data

US 2018/0007581 A1     Jan. 4, 2018

(51) Int. Cl.
| | |
|---|---|
| *H04B 7/0452* | (2017.01) |
| *H04W 28/02* | (2009.01) |
| *H04W 28/12* | (2009.01) |
| *H04L 1/00* | (2006.01) |
| *H04L 12/825* | (2013.01) |
| *H04L 12/835* | (2013.01) |

(52) U.S. Cl.
CPC ...... *H04W 28/0278* (2013.01); *H04B 7/0452* (2013.01); *H04L 1/0009* (2013.01); *H04L 47/26* (2013.01); *H04L 47/30* (2013.01); *H04W 28/12* (2013.01)

(58) Field of Classification Search
CPC ............. H04W 28/0278; H04W 28/10; H04B 7/0452; H04L 1/0009
See application file for complete search history.

(56) References Cited

U.S. PATENT DOCUMENTS

| | | | | |
|---|---|---|---|---|
| 6,275,502 B1* | 8/2001 | Arimilli | ................ | H04J 3/1688 370/468 |
| 6,327,249 B1* | 12/2001 | Cookman | ............... | H04L 27/00 370/235 |
| 2016/0380852 A1* | 12/2016 | Kawamori | ................ | G06F 8/61 709/224 |

* cited by examiner

*Primary Examiner* — Walter J Divito

(74) *Attorney, Agent, or Firm* — Schwegman Lundberg & Woessner, P.A.

(57) ABSTRACT

Computer readable media, methods, and apparatuses for flow control with acknowledgment feedback. An apparatus of a wireless device comprising: memory; and processing circuitry coupled to the memory is disclosed. The processing circuitry may be configured to determine based on buffer capacity parameters of a station and a receive buffer state of the station at least one of a size, a modulation and coding scheme (MCS), a bandwidth of a subchannel, or a number of spatial streams (NSS) for a frame. The processing circuitry may be further configured to encode the frame based on the size, the MCS, the bandwidth of the subchannel, and the NSS. The processing circuitry may be further configured to configure the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

23 Claims, 9 Drawing Sheets

FLOW CONTROL WITH ACKNOWLEDGMENT FEEDBACK

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for flow control with acknowledgments (ACK) or block acknowledgments (BA) feedback.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
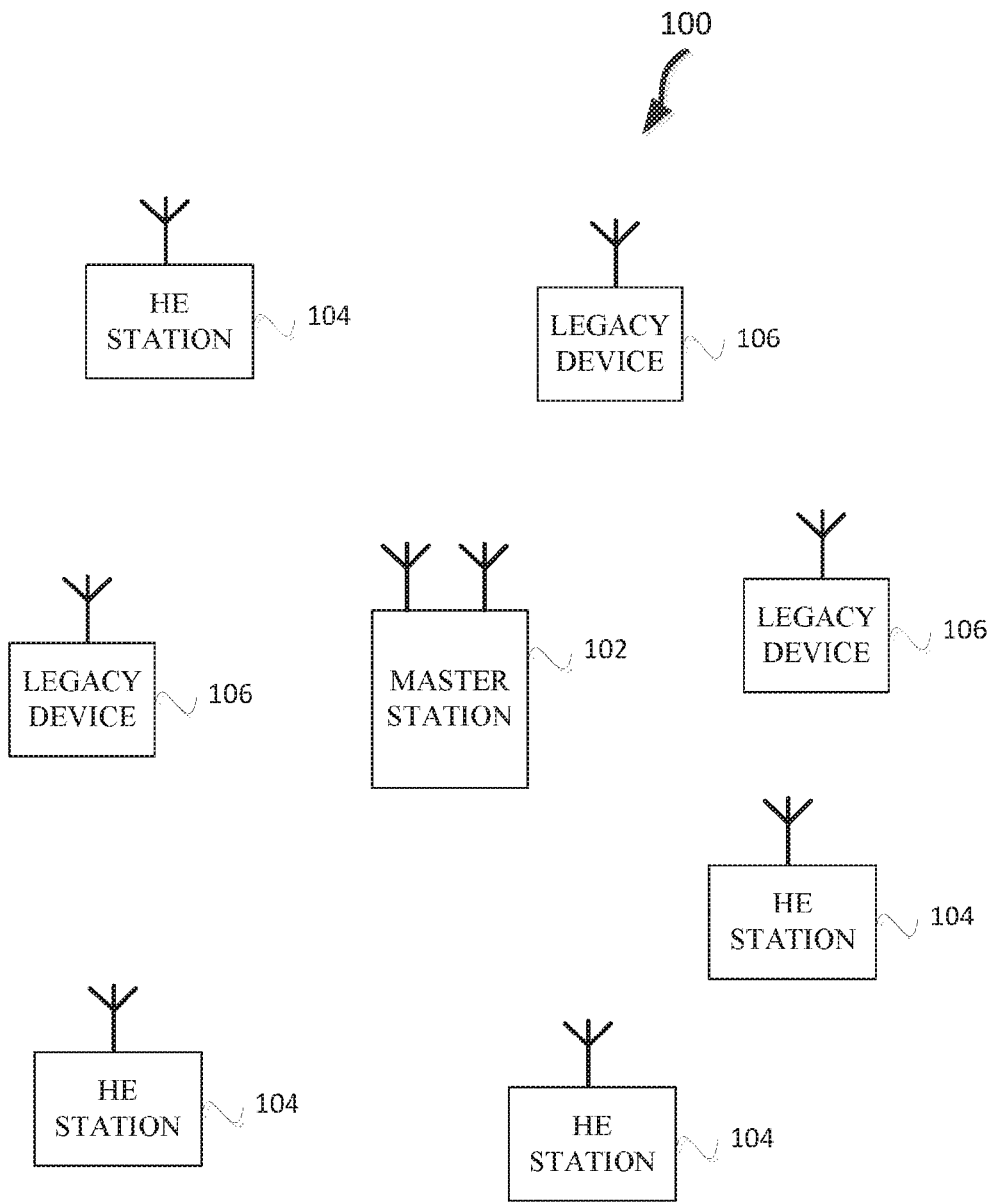
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-11.

Figure 2:
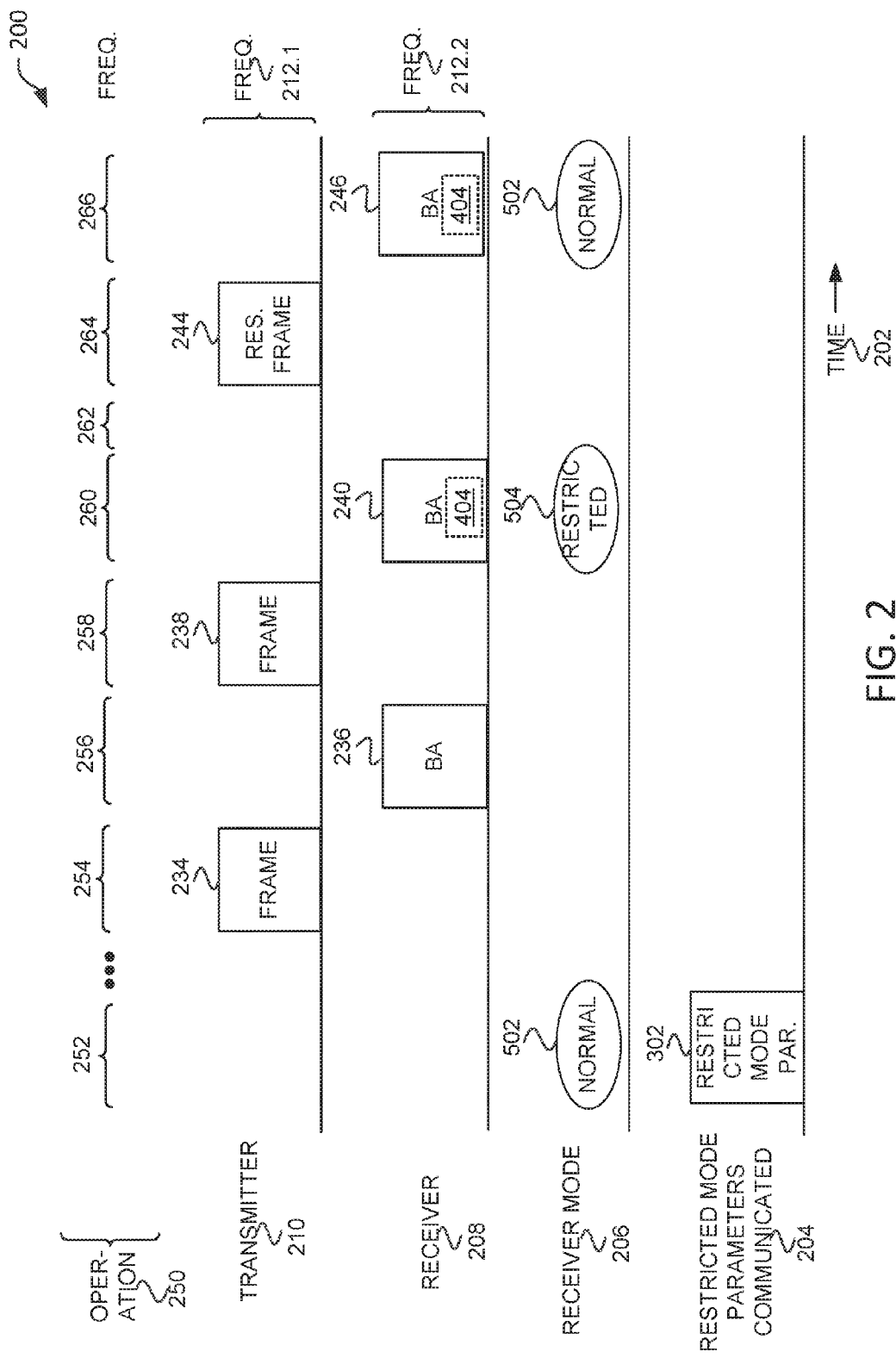
FIG. 2 illustrates a method 200 for flow control with acknowledgment feedback in accordance with some embodiments.

FIG. 2 illustrates a method 200 for flow control with acknowledgment feedback in accordance with some embodiments. Illustrated in FIG. 2 is time along a horizontal axis 202, restricted mode parameters communicated 204, receiver mode 206, receiver 208, transmitter 210, frequencies 212 along a vertical axis, and operations 250 along the top.

Restricted mode parameters communicated 204 may be an indication when restricted mode parameters 302 are communicated between the receiver 208 and the transmitter 210. The transmitter 210 may be a HE station 104 or master station 102. Receiver 208 may be a HE station 104 or master station 102. In some embodiments, there may be more than one receiver 208 and/or transmitter 210. For example, in some embodiments the transmitter 210 may initiate a transmission opportunity (TXOP) and transmit to more than one receiver 208. Receive mode 206 may be a mode of the receiver 208. In some embodiments, there are two modes of normal 502 and restricted 504. In some embodiments, the communication between transmitter 210 and receiver 208 is device-to-device (D2D) communication.

The frequencies 212 may be subchannels that are used to communicate between the transmitter 210 and the receiver 208. The frequencies 212 may be the same subchannels. FIGS. 2-5 are disclosed with one another.

The method 200 begins at operation 252 with the restricted mode parameters 302 being communicated between the transmitter 210 and receiver 208. The restricted mode parameters 302 need to be communicated before the receiver 208 enters restricted mode 504, in accordance with some embodiments. The restricted mode parameters 302 may be indicated in a frame exchange prior to operation 254, e.g. as part of a BA agreement. The restricted mode parameters 302 may be negotiated or indicated at association, e.g. when the receiver 208 associates with the transmitter 210. In some embodiments, the restricted mode parameters 302 may be negotiated or indicated after operation 254 but before or with operation 260. The receiver mode 206 may be normal 502.

Figure 3:
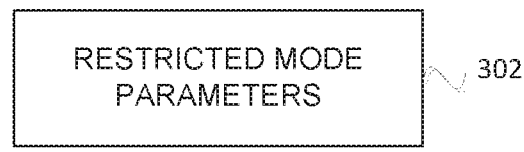
FIG. 3 illustrates restricted mode parameters in accordance with some embodiments.

FIG. 3 illustrates restricted mode parameters 302 in accordance with some embodiments. Restricted mode parameters 302 may include one or more of the following parameters. Maximum throughput at media access control (MAC) service access point (SAP), which may include the number of bits transmitted divided by the total elapsed time since the BA was received, which may include non-transmission time. Maximum aggregation per physical (PHY) Layer Convergence Procedure (PLCP) Protocol Data Unit (PPDU), which may be a limit to the number of MAC Protocol Data Unit (MPDU) per PPDU. Restricted mode parameters 302 may include one or more parameters that indicate a rate/throughput, a temporal aggregation limit (e.g., maximum PPDU duration), limitation of timing restrictions, and/or available resources in at the receiver 208 (e.g, buffer sizes.)

Figure 4:
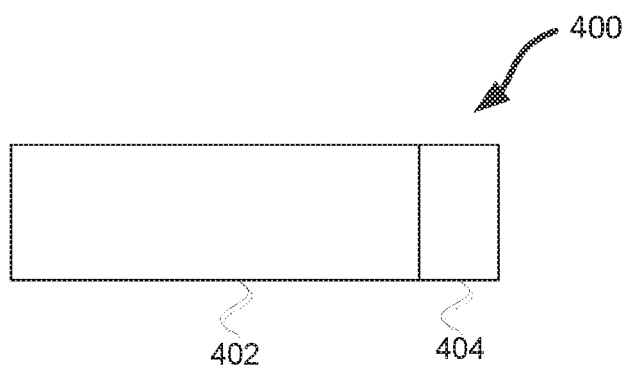
FIG. 4 illustrates a BA with a restricted mode indication in accordance with some embodiments.

FIG. 4 illustrates a BA 400 with a restricted mode indication 404 in accordance with some embodiments. The BA 400 may include BA 402 and mode indication 404. The BA 402 may include an indication of frames that are being acknowledged. The mode indication 404 may indicate a mode change of the receiver 208. The mode may be normal 502 or restricted 504. In some embodiments, the mode indication 404 may be a single bit that indicates the mode of the receiver 208.

Figure 5:
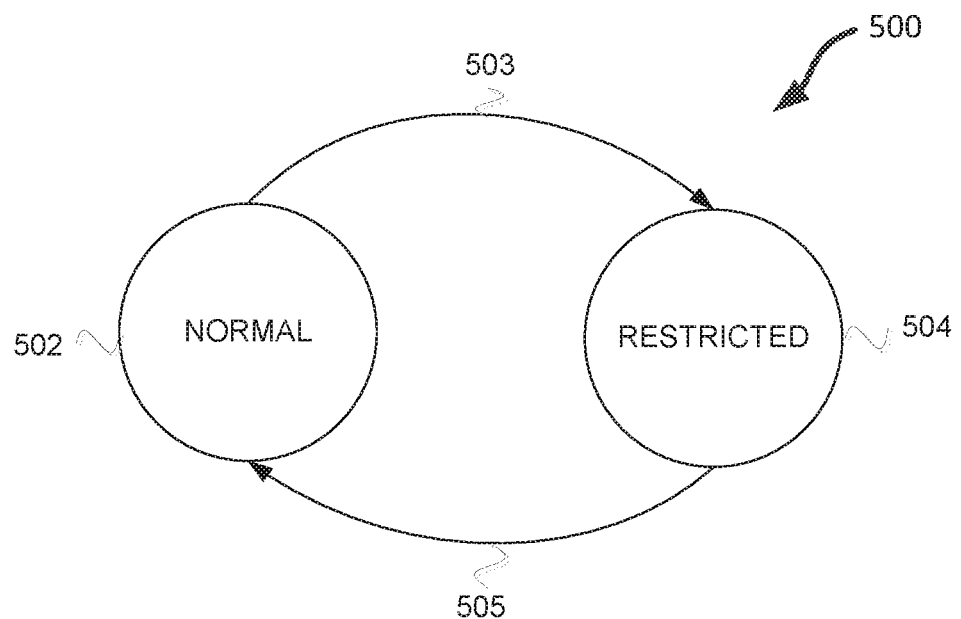
FIG. 5 illustrates a mode diagram of a receiver in accordance with some embodiments.

FIG. 5 illustrates a mode diagram 500 of a receiver in accordance with some embodiments. The mode diagram 500 may indicate modes of a receiver 208. The receiver 208 may have two modes normal 502 and restricted 504. The receiver 208 may switch between the two modes with a mode indication 404. In some embodiments, the receiver 208 starts in normal 502 and remains in normal 502 until the receiver 208 indicates a switch of mode to the transmitter 210.

Returning to FIG. 2, the method 200 may continue at operation 254 with the transmitter 210 transmitting a frame 234 to the receiver 208. The frame 234 may be a data frame, management frame, control frame, or another frame. The frame 234 may be part of a TXOP.

The method 200 continues at operation 256 with the receiver 208 transmitting a BA to the transmitter 210. The BA 236 may be part of a uplink (UL) transmission opportunity. The BA 236 may be transmitted in accordance with a schedule transmitted to the receiver 208 from the transmitter 210.

The method 200 continues at operation 258 with the transmitter 210 transmitting a frame 238. The method 200 continues at operation 260 with the receiver 208 transmitting a BA 240 that comprises a mode indication 404 that indicates the receiver 208 is switching to restricted mode 504.

The method 200 continues at operation 262 with the transmitter 210 waiting before transmitting restricted frame 244. The transmitter 210 may wait a time that is based on the restricted mode parameters 302.

The method 200 continues at operation 266 with the transmitter 210 transmitting restricted frame 244. The size or transmission parameters of restricted frame 244 may be based on the restricted mode parameters 302.

The method 200 may end or continue with one or more operations. For example, the method 200 may continue at operation 266 with the receiver 208 transmitting a BA 246 with a mode indication 404. The mode indication 404 may indicate the receiver 208 has gone back to normal mode 502 and the transmitter 210 may then transmit in accordance with normal mode 502.

Figure 6:
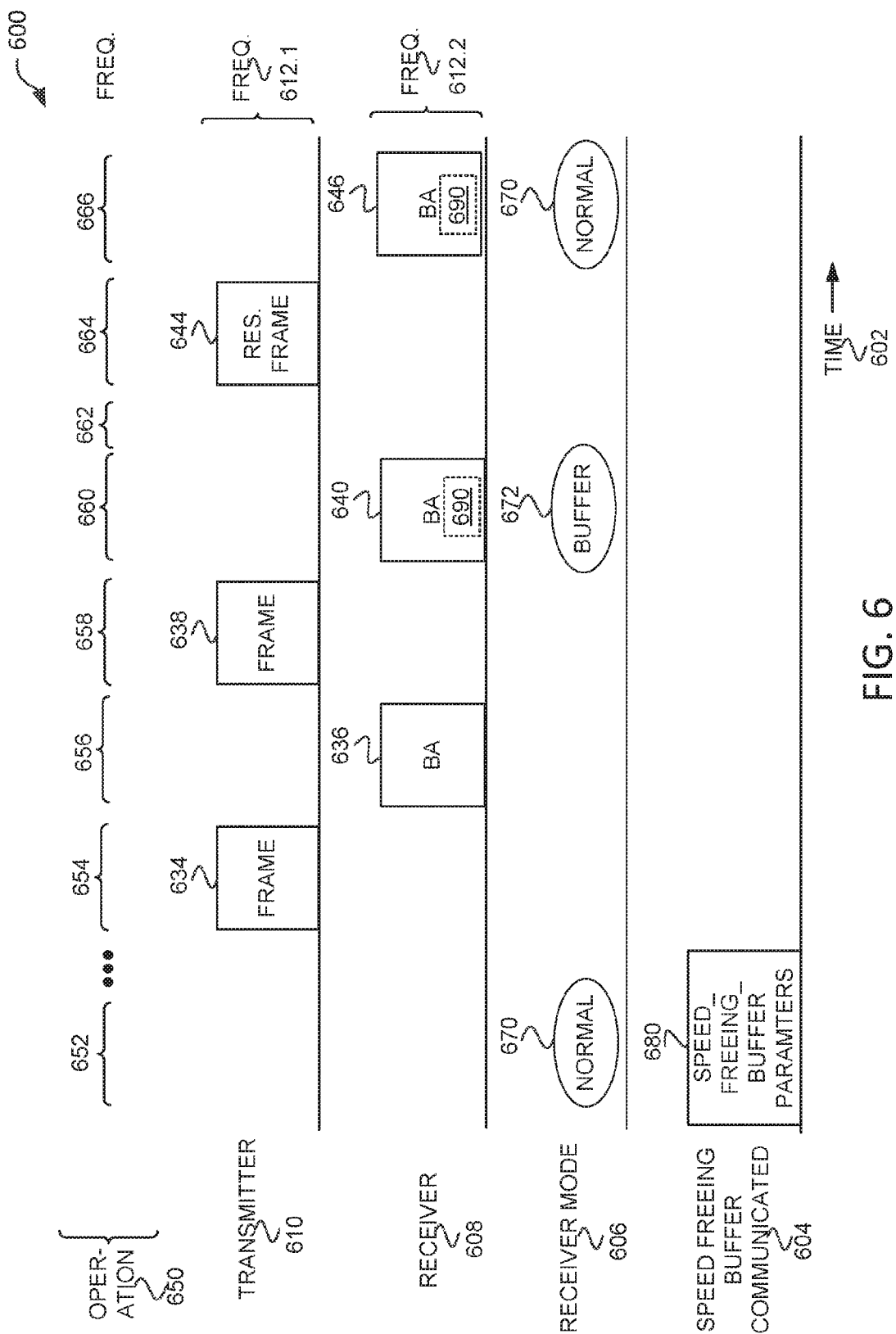
FIG. 6 illustrates a method for flow control with acknowledgment feedback in accordance with some embodiments.

FIG. 6 illustrates a method 600 for flow control with acknowledgment feedback in accordance with some embodiments. Illustrated in FIG. 6 is time along a horizontal axis 602, speed freeing buffer communicated 604, receiver mode 606, receiver 608, transmitter 610, frequencies 612 along a vertical axis, and operations 650 along the top.

Speed freeing buffer communicated 604 may be an indication when speed freeing buffer parameters 680 are communicated between the receiver 608 and the transmitter 610. The transmitter 610 may be a HE station 104 or master station 102. Receiver 608 may be a HE station 104 or master station 102. In some embodiments, there may be more than one receiver 608 and/or transmitter 610. For example, in some embodiments the transmitter 610 may initiate a transmission opportunity (TXOP) and transmit to more than one receiver 608. Receive mode 606 may be a mode of the receiver 608. In some embodiments, there are two modes of normal 670 mode and buffer 672 mode. In some embodiments, the communication between transmitter 610 and receiver 608 is device-to-device (D2D) communication.

The frequencies 612 may be subchannels that are used to communicate between the transmitter 610 and the receiver 608. The frequencies 612 may be the same subchannels.

The method 600 begins at operation 652 where the receive mode 606 is normal 670. In some embodiments, the receive mode 606 may begin in buffer 672. The speed freeing buffer parameters 680 may be exchanged before operation 654 (e.g., before data is transmitted from the transmitter 610 to the receiver 608.)

The speed freeing buffer parameters 680 may be an indication of speed limits at which the receiver 608 is capable of freeing new available buffers (e.g., "speed_freeing_buffer" may be the name of a parameter and a value of average_RBUFCAP may represent the remaining available buffers for the receiver 608.) The speed freeing buffer parameters 680 may be transmitted from the receiver 608 to the transmitter 610.

Speed freeing buffer parameter 680 may be indicated in a long-term manner such as part of the receiver 608 capabilities or a BA agreement, or may be indicated in the BA. An average_RBUFCAP (receiver buffer capability) may be indicated in a long term manner as part of the receiver 608 capabilities.

The speed freeing buffer parameters 680 may need to be communicated before the receiver 608 enters buffer mode 672, in accordance with some embodiments. The speed freeing buffer parameters 680 may be indicated in a frame exchange prior to operation 654, e.g. as part of a BA agreement. The speed freeing buffer parameters 680 may be negotiated or indicated at association, e.g. when the receiver 608 associates with the transmitter 610. In some embodiments, the speed freeing buffer parameters 680 may be negotiated or indicated after operation 654 but before or with operation 660.

The method 600 may continue at operation 654 with the transmitter 610 transmitting a frame 634 to the receiver 608. The frame 634 may be a data frame, management frame, control frame, or another frame. The frame 634 may be part of a TXOP.

The method 600 continues at operation 656 with the receiver 608 transmitting a BA 636 to the transmitter 610. The BA 636 may be part of a uplink (UL) transmission opportunity. The BA 636 may be transmitted in accordance with a schedule transmitted to the receiver 608 from the transmitter 610.

The method 600 continues at operation 658 with the transmitter 610 transmitting a frame 638. The method 600 continues at operation 660 with the receiver 608 transmitting a BA 640 that comprises a mode indication 690 that indicates the receiver 608 is switching to buffer mode 672. The receiver 608 may have determined that its receive buffers were nearly full and it needed to switch to buffer mode 672 to prevent dropping frames.

The method 600 continues at operation 662 with the transmitter 610 waiting before transmitting restricted frame 644. The transmitter 610 may wait a time that is based on the speed freeing buffer parameters 680. For example, transmitter 610 may determine a maximum frame size it can transmit to the receiver 608 once a time since the BA (e.g., "time_since_BA") has been spent since the reception of the BA frame 640. The frame size is equal to the estimated remaining available buffer of the receiver 608 (e.g., average_RBUFCAP+speed_freeing_buffer*time_since_BA). The transmitter 610 can then either wait a longer time to transmit restricted frame 644 or size restricted frame 644 in accordance with the time the transmitter 610 transmits restricted frame 644.

The method 600 continues at operation 664 with the transmitter 610 transmitting restricted frame 644 to the receiver. The method 600 may end or continue with one or more additional operations. For example, the method 600 may continue at operation 666 with the receiver 608 transmitting BA 646 with mode indication 690 that indicates the receiver 608 is switching back to normal mode 670.

In some embodiments, the transmitter 610 may determine which mode to put the receiver 608 in and transmit the mode indication 690 to the receiver 608.

Figure 7:
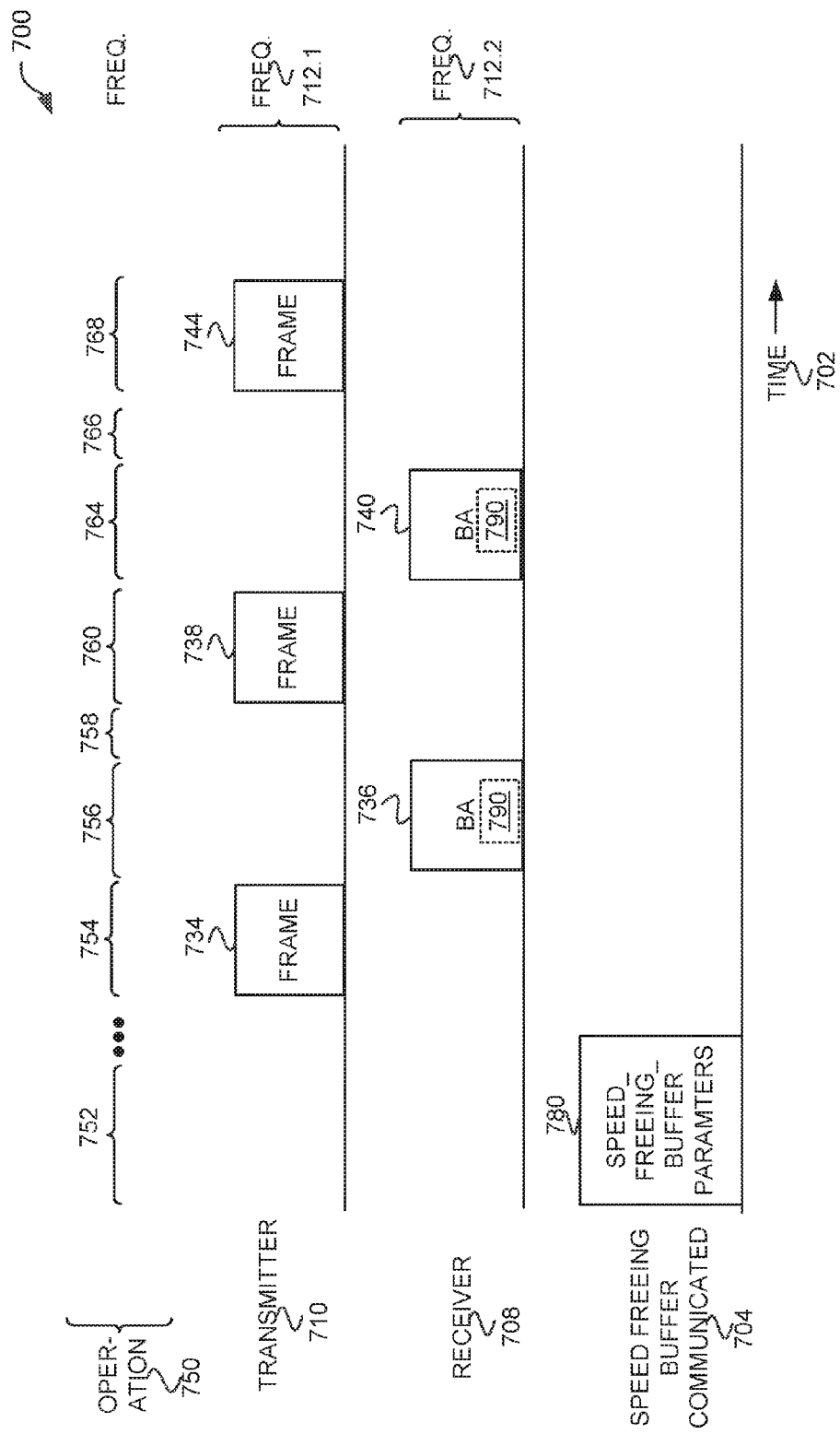
FIG. 7 illustrates a method for flow control with acknowledgment feedback in accordance with some embodiments.

FIG. 7 illustrates a method 700 for flow control with acknowledgment feedback in accordance with some embodiments. Illustrated in FIG. 7 is time along a horizontal axis 702, speed freeing buffer communicated 704, receiver 708, transmitter 710, frequencies 712 along a vertical axis, and operations 750 along the top.

Speed freeing buffer communicated 704 may be an indication when speed freeing buffer parameters 780 are communicated between the receiver 708 and the transmitter 710. The transmitter 710 may be a HE station 104 or master station 102. Receiver 708 may be a HE station 104 or master station 102. In some embodiments, there may be more than one receiver 708 and/or transmitter 710. For example, in some embodiments the transmitter 710 may initiate a transmission opportunity (TXOP) and transmit to more than one receiver 708. In some embodiments, the communication between transmitter 710 and receiver 708 is device-to-device (D2D) communication.

The frequencies 712 may be subchannels that are used to communicate between the transmitter 710 and the receiver 708. The frequencies 712 may be the same subchannels.

The method 700 begins at operation 752 where the speed freeing buffer parameters 780 may be exchanged before operation 754 (e.g., before data is transmitted from the transmitter 710 to the receiver 708.)

The speed freeing buffer parameters 780 may be an indication of speed limits at which the receiver 708 is capable of freeing new available buffers (e.g., "speed_freeing_buffer" may be the name of a parameter and a value of average_RBUFCAP may represent the remaining available buffers for the receiver 708.) The speed freeing buffer parameters 780 may be transmitted from the receiver 708 to the transmitter 710.

Speed freeing buffer parameter 780 may be indicated in a long-term manner such as part of the receiver 708 capabilities or a BA agreement, or may be indicated in the BA. An average_RBUFCAP (receiver buffer capability) may be indicated in a long term manner as part of the receiver 708 capabilities.

The speed freeing buffer parameters 780 may be indicated in a frame exchange prior to operation 754, e.g. as part of a BA agreement. The speed freeing buffer parameters 780 may be negotiated or indicated at association, e.g. when the receiver 708 associates with the transmitter 710. In some embodiments, the speed freeing buffer parameters 780 may be negotiated or indicated after operation 754 but before or with operation 756.

The method 700 may continue at operation 754 with the transmitter 710 transmitting a frame 734 to the receiver 708. The frame 734 may be a data frame, management frame, control frame, or another frame. The frame 734 may be part of a TXOP.

The method 700 continues at operation 756 with the receiver 708 transmitting a BA 736 with a size of available receiver buffer 790 to the transmitter 710. The size of available receiver buffer 790 may indicate the size of the available receive buffer at the receiver 708. The size of available receiver buffer 790 may be eight bits in some embodiments. The BA 736 may be part of a uplink (UL) transmission opportunity. The BA 736 may be transmitted in accordance with a schedule transmitted to the receiver 708 from the transmitter 710.

The method 700 continues at operation 758 with the transmitter 710 waiting before operation 760. The transmitter 710 may determine based on speed_freeing_buffer and receiver buffer at receiver 708 how much receiver buffer is available at the receiver 708 e.g., (receiver buffer at receiver 708)+speed_freeing_buffer (from speed_freeing_buffer_parameters 780)*time_since_BA (which may be based on the time it BA was transmitted by the receiver 708 or a time when the BA was received by the transmitter 710.) The transmitter 710 may wait to transmit to the receiver 708 and/or may size the frame 738 in accordance with the determined free receiver buffer at the receiver 708.

The method 700 continues at operation 760 with the transmitter 710 transmitting frame 738 to the receiver. The transmitter 710 may determine the size of the frame 738 as described herein based on the speed_freeing_buffer, receiver buffer at receiver 708, and a time since the BA 736.

The method 700 continues at operation 764 with the receiver 708 transmitting BA 740. The BA 740 includes available receiver buffer 790.

The method 700 continues at operation 766 with the transmitter 710 waiting before operation 768. The transmitter 710 may determine again based on speed_freeing_buffer and receiver buffer at receiver 708 how much receiver buffer is available at the receiver 708 e.g., (receiver buffer at receiver 708)+speed_freeing_buffer (from speed_freeing_buffer_parameters 780)*time_since_BA (which may be based on the time it BA was transmitted by the receiver 708 or a time when the BA was received by the transmitter 710.) The transmitter 710 may wait to transmit to the receiver 708 and/or may size the frame 744 in accordance with the determined free receiver buffer at the receiver 708.

The method 700 continues at operation 768 with the transmitter 710 transmitting frame 744 to the receiver. The transmitter 710 may determine the size of the frame 744 as described herein based on the speed_freeing_buffer, receiver buffer at receiver 708, and a time since the BA 736. The method 700 may end or continue with one or more additional operations.

Figure 8:
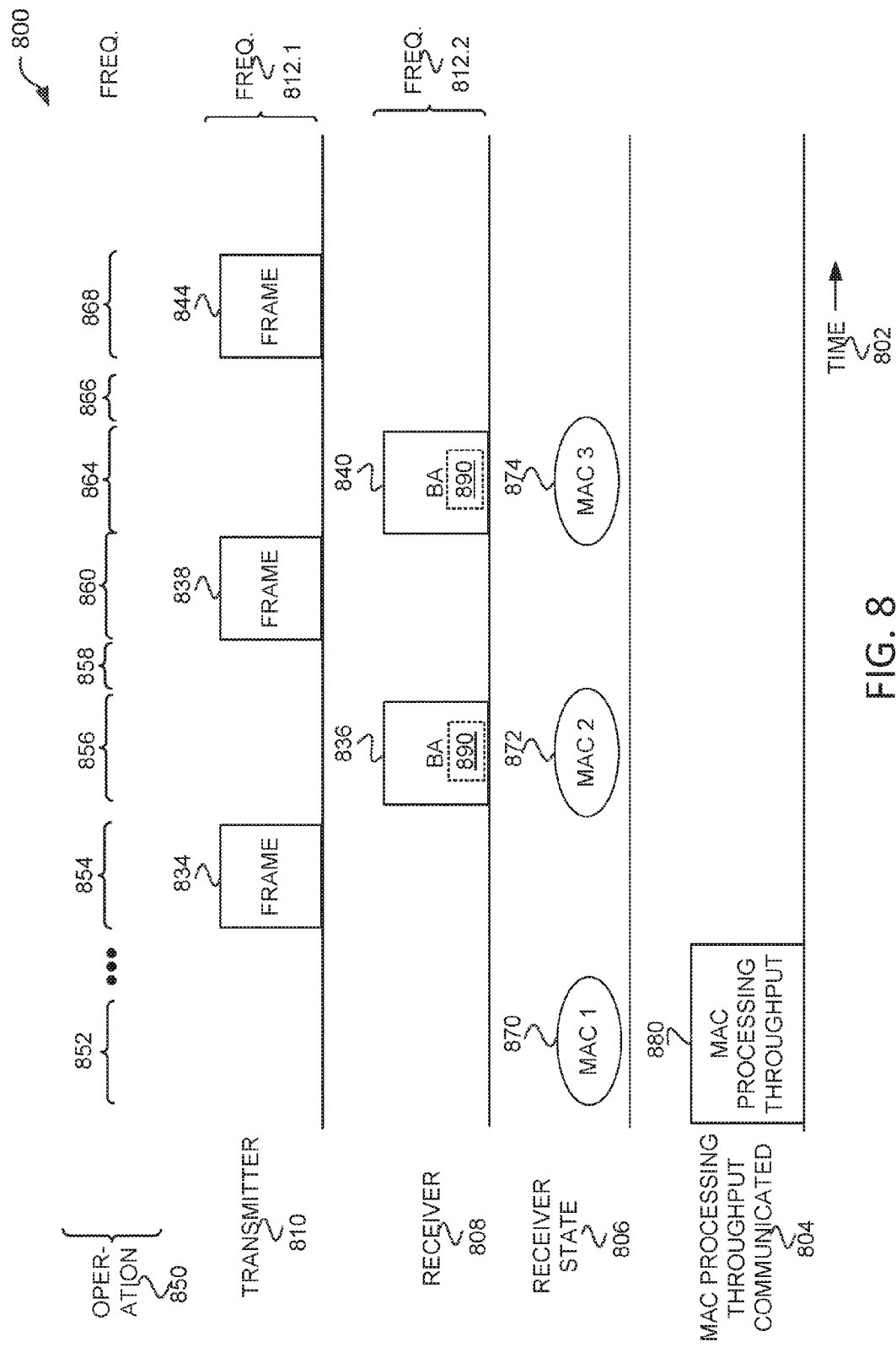
FIG. 8 illustrates a method for flow control with acknowledgment feedback in accordance with some embodiments.

FIG. 8 illustrates a method 800 for flow control with acknowledgment feedback in accordance with some embodiments. Illustrated in FIG. 8 is time along a horizontal axis 802, MAC processing throughput communicated 804, receiver 808, transmitter 810, frequencies 812 along a vertical axis, and operations 850 along the top.

MAC processing throughput communicated 804 may be an indication when MAC processing throughput communicated 804 are communicated between the receiver 808 and the transmitter 810. The transmitter 810 may be a HE station 104 or master station 102. Receiver 808 may be a HE station 104 or master station 102. In some embodiments, there may be more than one receiver 808 and/or transmitter 810. For example, in some embodiments the transmitter 810 may initiate a transmission opportunity (TXOP) and transmit to more than one receiver 808. In some embodiments, the communication between transmitter 810 and receiver 808 is device-to-device (D2D) communication.

The frequencies 812 may be subchannels that are used to communicate between the transmitter 810 and the receiver 808. The frequencies 812 may be the same subchannels.

The receiver 808 may be configured to have different MAC processing throughput processing rates (e.g., MAC 1, MAC 2, MAC 3, . . . ). For example, the receiver 808 may be able to reduce its MAC processing throughput to reduce power consumption. The receiver 808 may adapt its MAC processing throughput based on the physical layer rate that it is using (e.g., the number of spatial streams, etc.), in accordance with some embodiments.

The method 800 begins at operation 852 where the MAC processing throughput 880 may be exchanged before operation 854 (e.g., before data is transmitted from the transmitter 810 to the receiver 808.)

The MAC processing throughput 880 may indicate different MAC processing throughput processing rates (e.g., MAC 1, MAC 2, MAC 3, . . . ) that the receiver 808 may signal to the transmitter 810. The MAC processing throughput 880 may be an indication of a look-up table entry at the transmitter 810. In some embodiments, the MAC processing throughput 880 may indicate a MAC processing throughput value associated with one or more of the following: a modulation and coding scheme (MCS), a bandwidth, a number of spatial streams (NSS), or a physical layer rate interval. The receiver state 806 may have an initial value of MAC 1 870.

The method 800 may continue at operation 854 with the transmitter 810 transmitting a frame 834 to the receiver 808. The frame 834 may be a data frame, management frame, control frame, or another frame. The frame 834 may be part of a TXOP. The frame 834 may be configured in accordance with the MAC 1 870. For example, the size of the frame 834 may depend on MAC 1 870. In another example, the transmitter 810 may select a MCS, bandwidth, and/or NSS to accommodate the frame 834.

The method 800 continues at operation 856 with the receiver 808 transmitting a BA 836 with a receiver state 890 to the transmitter 710. The receiver state 890 may be MAC 2 872, which may indicate a reduced MAC processing state of the receiver 808 so that the receiver 808 may reduce power consumption. The receiver state 890 may be signaled in a BA field, a field of a HE control field or another field.

The method 800 continues at operation 858 with the transmitter 810 waiting before operation 860. The transmitter 810 may determine based on MAC 2 872 and MAC processing throughput 880 a time to wait. The transmitter 810 may wait to transmit to the receiver 808 and/or may size the frame 838 in accordance with the determined time to wait. In some embodiments, the transmitter 810 may not determine a time to wait based on the MAC 2 872 and MAC processing throughput 880 a time to wait.

The method 800 continues at operation 860 with the transmitter 810 transmitting frame 838 to the receiver. The transmitter 810 may determine the size of the frame 838 as described herein based on the based on the MAC 2 872 and MAC processing throughput 880 a time to wait.

The method 800 continues at operation 864 with the receiver 808 transmitting BA 840. The BA 840 includes receiver state 806 with MAC 3 874, which may indicate a reduced or increased MAC processing state of the receiver 808.

The method 800 continues at operation 866 with the transmitter 810 waiting before operation 868. The transmitter 810 may determine based on MAC 3 874 and MAC processing throughput 880 a time to wait. The transmitter 810 may wait to transmit to the receiver 808 and/or may size the frame 844 in accordance with the determined time to wait. In some embodiments, the transmitter 810 may not determine a time to wait based on the MAC 3 874 and MAC processing throughput 880 a time to wait.

The method 800 continues at operation 868 with the transmitter 810 transmitting frame 844 to the receiver. The transmitter 810 may determine the size of the frame 844 as described herein based on the MAC 3 874, MAC processing throughput 880, and/or a time since the BA 840, a time to wait. The method 800 may end or continue with one or more additional operations.

Figure 9:
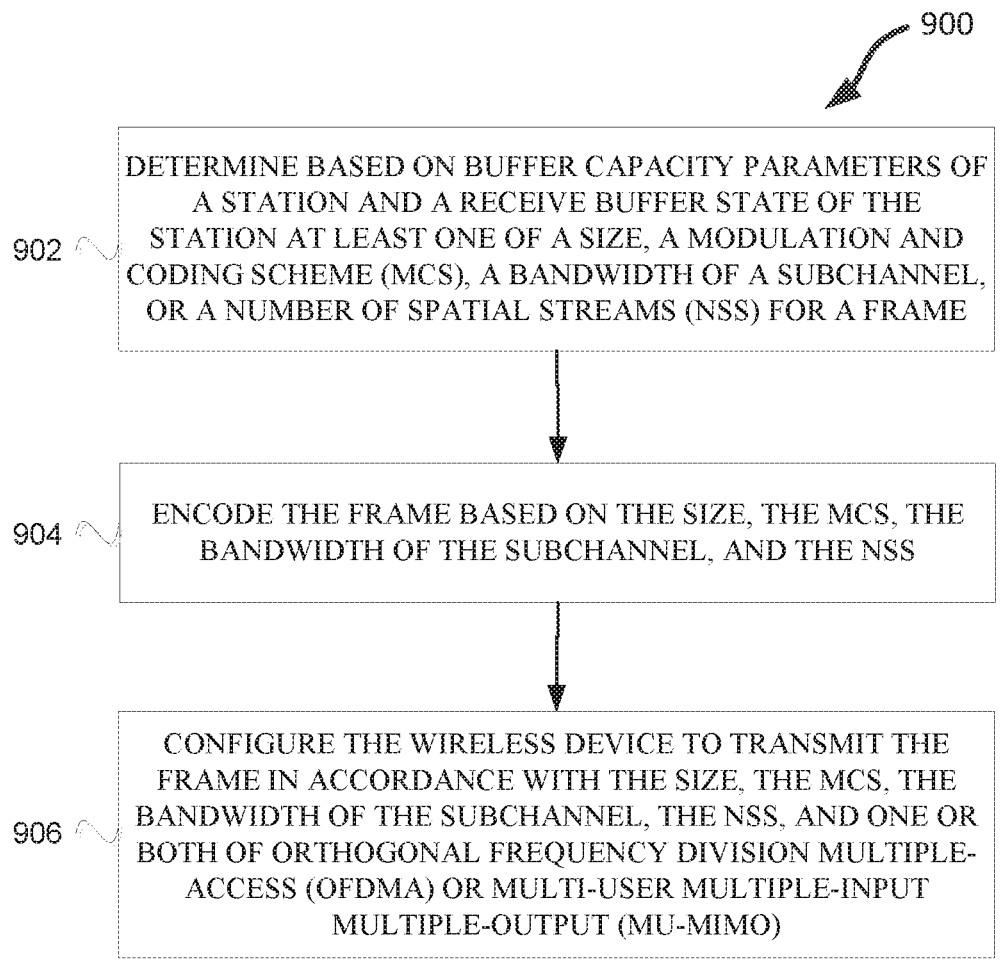
FIG. 9 illustrates a method for flow control with acknowledgment feedback in accordance with some embodiments.

FIG. 9 illustrates a method 900 for flow control with acknowledgment feedback in accordance with some embodiments. The method 900 may begin at operation 902 with determining based on buffer capacity parameters of a station and a receive buffer state of the station at least one of a size, a modulation and coding scheme (MCS), a bandwidth of a subchannel, or a number of spatial streams (NSS) for a frame.

For example, transmitter 210 may determine based on restricted mode parameters 302 of a receiver 208 and a receive mode 206 of the receiver 208 at least one of a size, a modulation and coding scheme (MCS), a bandwidth of a subchannel, or a number of spatial streams (NSS) for a frame 234, 238, or 244.

In another example, transmitter 610 may determine based on speed freeing buffer parameters 680 of a receiver 608 and a receive mode 606 of the receiver 608 at least one of a size, a modulation and coding scheme (MCS), a bandwidth of a subchannel, or a number of spatial streams (NSS) for a frame 634, 638, or 644.

In another example, transmitter 710 may determine based on speed freeing buffer parameters 780 of a receiver 708 and a size of available receiver buffer 790 of the receiver 708 at least one of a size, a modulation and coding scheme (MCS), a bandwidth of a subchannel, or a number of spatial streams (NSS) for a frame 734, 738, or 744.

In another example, transmitter 810 may determine based on MAC processing throughput 880 of a receiver 808 and a receiver state 806 of the receiver 808 at least one of a size, a modulation and coding scheme (MCS), a bandwidth of a subchannel, or a number of spatial streams (NSS) for a frame 834, 838, or 844.

The method 900 may continue at operation 904 with encoding the frame based on the size, the MCS, the bandwidth of the subchannel, and the NSS.

The method 900 may continue at operation 906 with configuring the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

For example for operations 904 and 906, an apparatus of a transmitter 210, 610, 710, 810 may encode frames (234, 238, or 244), (634, 638, or 644), (734, 738, or 744), and (834, 838, or 844), respectively, in accordance with at least one of a size, a modulation and coding scheme (MCS), a bandwidth of a subchannel, or a number of spatial streams (NSS), and configure the transmitter 210, 610, 710, 810 to transmit the respective frame (234, 238, or 244), (634, 638, or 644), (734, 738, or 744), and (834, 838, or 844). The method 900 may end or may continue with one or more additional operations.

Figure 10:
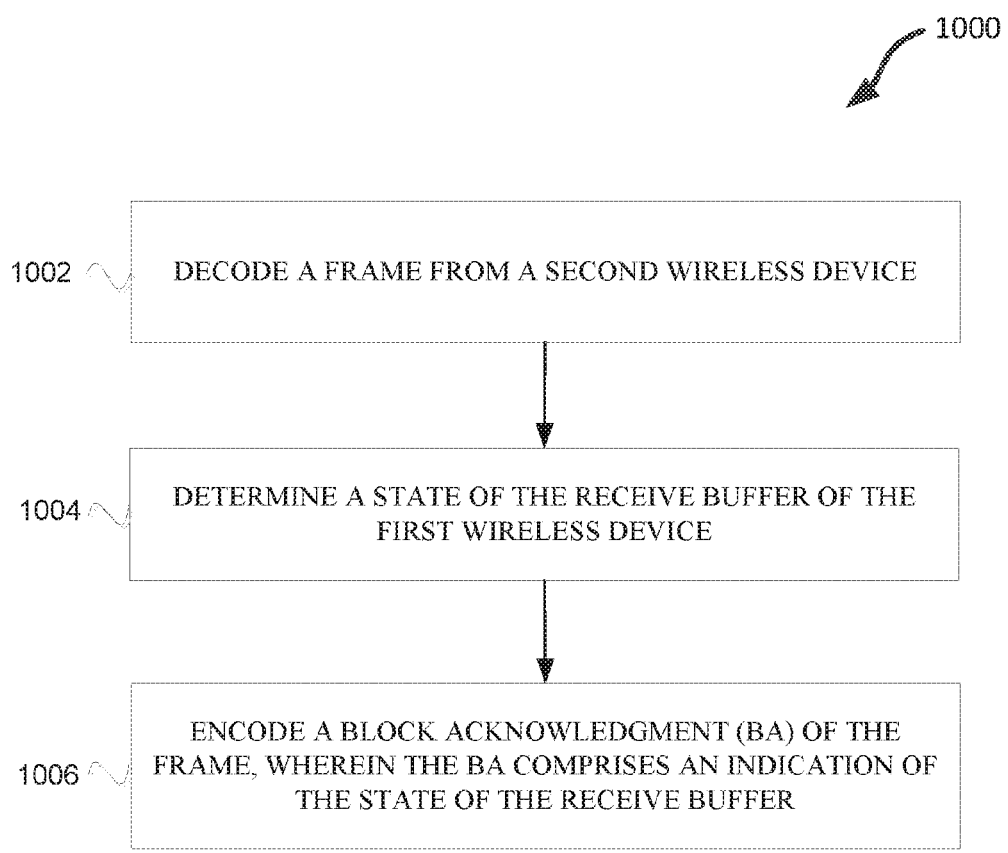
FIG. 10 illustrates a method for flow control with acknowledgment feedback in accordance with some embodiments.

FIG. 10 illustrates a method 1000 for flow control with acknowledgment feedback in accordance with some embodiments. The method 1000 may begin at operation 1002 with decoding a frame from a second wireless device. For example, receiver 208 may decode frame 238 from the transmitter 210. In another example, receiver 608 may decode frame 638 from the transmitter 610. In another example, receiver 708 may decode frame 734 from the transmitter 710. In another example, receiver 808 may decode frame 834 from the transmitter 810.

The method 1000 may continue at operation 1004 with determining a state of the receive buffer of the first wireless device. For example, receiver 208 may determine receiver mode 206. In another example, receiver 608 may determine receiver mode 606. In another example, receiver 708 may determine a size of available receiver buffer 790. In another example, receiver 808 may determine receiver state 806.

The method 1000 may continue at operation 906 with encoding a block acknowledgment (BA) of the frame, wherein the BA comprises an indication of the state of the receive buffer. For example, receiver 208 may encode BA 240 with the receiver mode 404. In another example, receiver 608 may encode BA 640 with the receiver mode 606. In another example, receiver 708 may encode BA 736 with a size of available receiver buffer 790. In another example, receiver 808 may encode 836 with receiver state 806. The method 1000 may end or continue with one or more additional operations.

Figure 11:
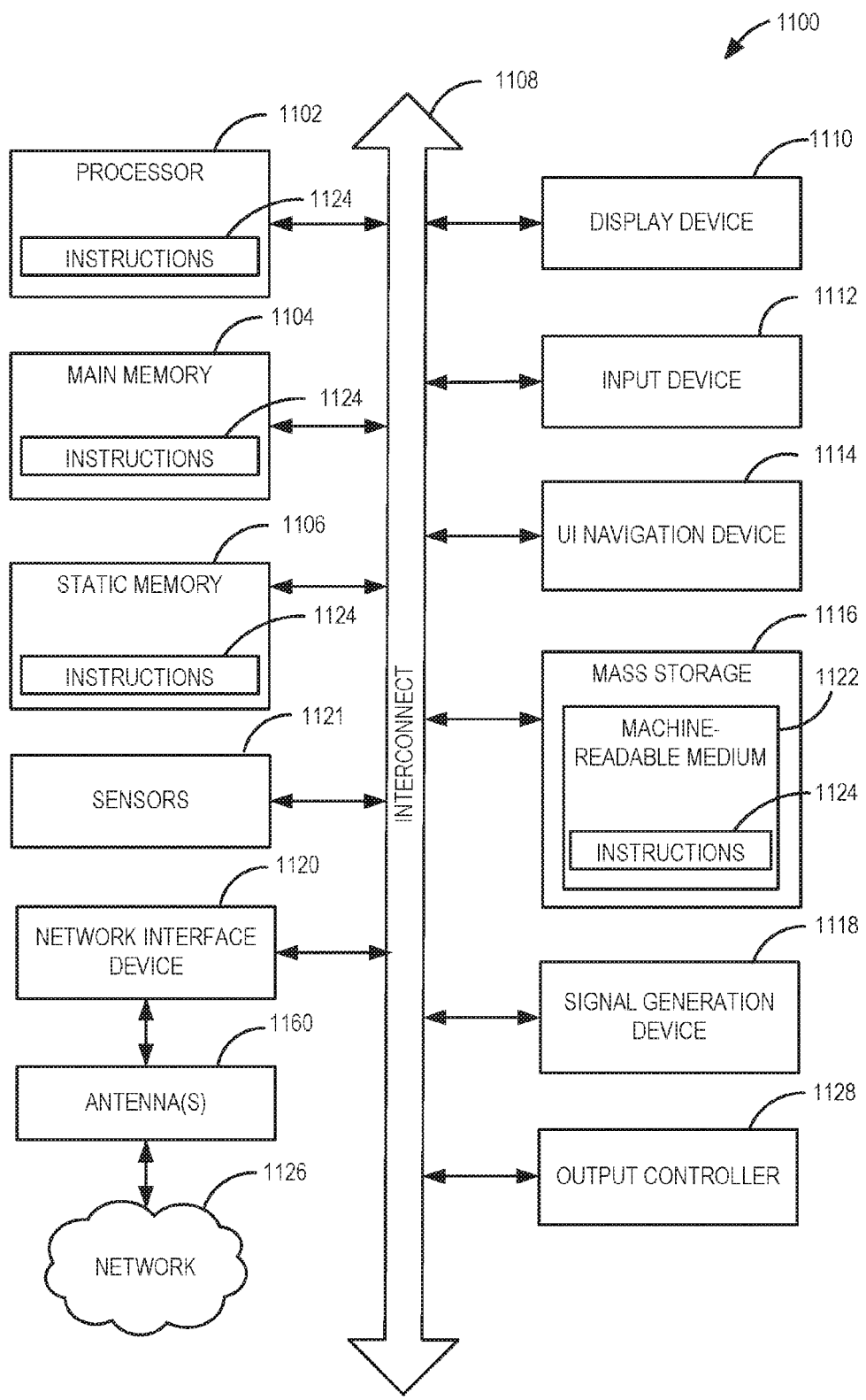
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device comprising: memory; and processing circuitry coupled to the memory, the processing circuity configured to: determine based on buffer capacity parameters of a station and a receive buffer state of the station at least one of a size, a modulation and coding scheme (MCS), a bandwidth of a subchannel, or a number of spatial streams (NSS) for a frame; encode the frame based on the size, the MCS, the bandwidth of the subchannel, and the NSS; and configure the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

In Example 2, the subject matter of Example 1 optionally includes where the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station.

In Example 3, the subject matter of any one or more of Examples 1-2 optionally include where the receive buffer state is one from the following group: normal, restricted, buffered, an indication of a size of available receiver buffer, media access control (MAC) limited, and MAC normal.

In Example 4, the subject matter of any one or more of Examples 1-3 optionally include where the processing circuitry is further configured to: determine one or more one of the size, the MCS, the bandwidth of the subchannel, or the NSS for the frame without restrictions, if the receive buffer state indicates a normal state; and determine one or more one of the size, the MCS, the bandwidth of the subchannel, or the NSS for the frame with restrictions based on the buffer capacity parameters of the station, if the receive buffer state indicates a restricted state.

In Example 5, the subject matter of Example 4 optionally includes where the processing circuitry is further configured to: decode a block acknowledgement including the receive buffer state from the station, where the receive buffer state is restricted or normal.

In Example 6, the subject matter of any one or more of Examples 1-5 optionally include where the processing circuitry is further configured to: decode a block acknowledgement (BA) including the receive buffer state from the station, where the receive buffer state is buffered state or normal state; determine one or more one of the size, the MCS, the bandwidth of the subchannel, or the NSS for the frame without restrictions based on the buffer capacity parameters of the station, if the receive buffer state indicates the normal state; and determine one or more one of the size, the MCS, the bandwidth of the subchannel, or the NSS for the frame with restrictions based on the buffer capacity parameters of the station, a time since the BA was received, and a speed freeing rate of the station receive buffer, if the receive buffer state indicates the buffered state.

In Example 7, the subject matter of any one or more of Examples 4-6 optionally include where the processing circuitry is further configured to: decode a block acknowledgement (BA) including the receive buffer state from the station, where the receive buffer state indicates an available receiver buffer size; and determine one or more one of the size, the MCS, the bandwidth of the subchannel, or the NSS for the frame with restrictions based on the buffer capacity parameters of the station, a time since the BA was received, and the available receiver buffer size.

In Example 8, the subject matter of any one or more of Examples 1-7 optionally include where the processing circuitry is further configured to: decode a block acknowledgement (BA) including the receive buffer state from the station, where the receive buffer state indicates a media access control (MAC) processing throughput state; and determine one or more one of the size, the MCS, the bandwidth of the subchannel, or the NSS for the frame with restrictions based on the buffer capacity parameters of the station and the MAC processing throughput state.

In Example 9, the subject matter of Example 8 optionally includes where the processing circuitry is further configured to: decode a second frame including the buffer capacity parameters indicating two or more MAC processing throughput states that are supported by the station.

In Example 10, the subject matter of any one or more of Examples 8-9 optionally include where the receive buffer state is indicated in a high-efficiency (HE) field of the physical header of the BA or in a field of the MAC portion of the BA.

In Example 11, the subject matter of any one or more of Examples 1-10 optionally include where the processing circuitry is further configured to: receive the buffer capacity parameters from the station.

In Example 12, the subject matter of any one or more of Examples 1-11 optionally include where the processing circuitry is further configured to: encode a second frame with proposed buffer capacity parameters for the station; configure the wireless device to transmit the proposed buffer capacity parameters to the station; and decode a third frame with the buffer capacity parameters, where the third frame is received from the station and the buffer capacity parameters are different than the proposed buffer capacity parameters.

In Example 13, the subject matter of any one or more of Examples 1-12 optionally include where the processing circuitry is further configured to: decode a block acknowledgment from the station including an indication of the receive buffer state.

In Example 14, the subject matter of any one or more of Examples 1-13 optionally include where the wireless device and the one or more stations are each one from the following group: an Institute of Electrical and Electronic Engineers (IEEE) 14 is missing parent: 14 is missing parent: 802.11ax access point, an IEEE 802.11ax station, an IEEE 14 is missing parent: 14 is missing parent: 802.11 station, and an IEEE 802.11 access point.

In Example 15, the subject matter of any one or more of Examples 1-14 optionally include transceiver circuitry coupled to the processing circuitry.

In Example 16, the subject matter of Example 15 optionally includes one or more antennas coupled to the transceiver circuitry.

Example 17 is a non-transitory computer-readable storage medium that stores instructions for execution by one or more processors, the instructions to configure the one or more processors to cause a wireless device to: determine based on buffer capacity parameters of a station and a receive buffer state of the station at least one of a size, a modulation and coding scheme (MCS), a bandwidth of a subchannel, or a number of spatial streams (NSS) for a frame; encode the frame based on the size, the MCS, the bandwidth of the subchannel, and the NSS; and configure the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

In Example 18, the subject matter of Example 17 optionally includes where the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station, and where the receive buffer state is one from the following group: normal, restricted, buffered, an indication of a size of available receiver buffer, media access control (MAC) limited, and MAC normal.

Example 19 is a method performed by a wireless device, the method including: determining based on buffer capacity parameters of a station and a receive buffer state of the station at least one of a size, a modulation and coding scheme (MCS), a bandwidth of a subchannel, or a number of spatial streams (NSS) for a frame; encoding the frame based on the size, the MCS, the bandwidth of the subchannel, and the NSS; and configuring the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

In Example 20, the subject matter of Example 19 optionally includes where the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station, and where the receive buffer state is one from the following group: normal, restricted, buffered, an indication of a size of available receiver buffer, media access control (MAC) limited, and MAC normal.

Example 21 is an apparatus of a first wireless device including: memory; and processing circuitry coupled to the memory, the processing circuity configured to: decode a frame from a second wireless device; determine a state of the receive buffer of the first wireless device; and encode a block acknowledgment (BA) of the frame, where the BA comprises an indication of the state of the receive buffer.

In Example 22, the subject matter of Example 21 optionally includes where the state of the receiver buffer is one of the following group: an available receiver buffer size, normal, buffer, restricted, or a media access control (MAC) processing throughput state.

In Example 23, the subject matter of any one or more of Examples 21-22 optionally include where the processing circuitry is further configured to: determine if there is a risk of the receive buffer overflowing; if there is not the risk of the receive buffer overflowing, determine the state of the receive buffer to be normal, and if there is the risk of the receive buffer overflowing, determine the state of the receive buffer to be restricted or buffer.

In Example 24, the subject matter of any one or more of Examples 21-23 optionally include where the processing circuitry is further configured to: encode buffer capacity parameters, the buffer capacity parameters indicating parameters related to the buffer capacity of the first wireless device; and transmit the buffer capacity parameters to the second wireless device.

In Example 25, the subject matter of any one or more of Examples 21-24 optionally include transceiver circuitry coupled to the processing circuitry; and one or more antennas coupled to the transceiver circuitry.

Example 26 is an apparatus of a wireless device, apparatus including: means for determining based on buffer capacity parameters of a station and a receive buffer state of the station at least one of a size, a modulation and coding scheme (MCS), a bandwidth of a subchannel, or a number of spatial streams (NSS) for a frame; means for encoding the frame based on the size, the MCS, the bandwidth of the subchannel, and the NSS; and means for configuring the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

In Example 27, the subject matter of Example 26 optionally includes where the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station.

In Example 28, the subject matter of any one or more of Examples 26-27 optionally include where the receive buffer state is one from the following group: normal, restricted, buffered, an indication of a size of available receiver buffer, media access control (MAC) limited, and MAC normal.

In Example 29, the subject matter of any one or more of Examples 26-28 optionally include means for determining one or more one of the size, the MCS, the bandwidth of the subchannel, or the NSS for the frame without restrictions, if the receive buffer state indicates a normal state; and means for determining one or more one of the size, the MCS, the bandwidth of the subchannel, or the NSS for the frame with restrictions based on the buffer capacity parameters of the station, if the receive buffer state indicates a restricted state.

In Example 30, the subject matter of Example 29 optionally includes means for decoding a block acknowledgement including the receive buffer state from the station, where the receive buffer state is restricted or normal.

In Example 31, the subject matter of any one or more of Examples 29-30 optionally include means for decoding a block acknowledgement (BA) including the receive buffer state from the station, where the receive buffer state is buffered state or normal state; means for determining one or more one of the size, the MCS, the bandwidth of the subchannel, or the NSS for the frame without restrictions based on the buffer capacity parameters of the station, if the receive buffer state indicates the normal state; and means for determining one or more one of the size, the MCS, the bandwidth of the subchannel, or the NSS for the frame with restrictions based on the buffer capacity parameters of the station, a time since the BA was received, and a speed freeing rate of the station receive buffer, if the receive buffer state indicates the buffered state.

In Example 32, the subject matter of any one or more of Examples 29-31 optionally include means for decoding a block acknowledgement (BA) including the receive buffer state from the station, where the receive buffer state indicates an available receiver buffer size; and means for determining one or more one of the size, the MCS, the bandwidth of the subchannel, or the NSS for the frame with restrictions based on the buffer capacity parameters of the station, a time since the BA was received, and the available receiver buffer size.

In Example 33, the subject matter of any one or more of Examples 26-32 optionally include means for decoding a block acknowledgement (BA) including the receive buffer state from the station, where the receive buffer state indicates a media access control (MAC) processing throughput state; and means for determining one or more one of the size, the MCS, the bandwidth of the subchannel, or the NSS for the frame with restrictions based on the buffer capacity parameters of the station and the MAC processing throughput state.

In Example 34, the subject matter of Example 33 optionally includes means for decoding a second frame including the buffer capacity parameters indicating two or more MAC processing throughput states that are supported by the station.

In Example 35, the subject matter of Example 34 optionally includes where the receive buffer state is indicated in a high-efficiency (HE) field of the physical header of the BA or in a field of the MAC portion of the BA.

In Example 36, the subject matter of any one or more of Examples 26-35 optionally include means for receiving the buffer capacity parameters from the station.

In Example 37, the subject matter of any one or more of Examples 26-36 optionally include means for encoding a second frame with proposed buffer capacity parameters for the station; means for configuring the wireless device to transmit the proposed buffer capacity parameters to the station; and means for decoding a third frame with the buffer capacity parameters, where the third frame is received from the station and the buffer capacity parameters are different than the proposed buffer capacity parameters.

In Example 38, the subject matter of any one or more of Examples 26-37 optionally include means for decoding a block acknowledgment from the station including an indication of the receive buffer state.

In Example 39, the subject matter of any one or more of Examples 26-38 optionally include where the wireless device and the one or more stations are each one from the following group: an Institute of Electrical and Electronic Engineers (IEEE) 39 is missing parent: 39 is missing parent: 802.11ax access point, an IEEE 802.11ax station, an IEEE 39 is missing parent: 39 is missing parent: 802.11 station, and an IEEE 802.11 access point.

In Example 40, the subject matter of any one or more of Examples 26-39 optionally include means for transmitting and receiving radio signals.

Example 41 is a non-transitory computer-readable storage medium that stores instructions for execution by one or more processors, the instructions to configure the one or more processors to cause a wireless device to: decode a frame from a second wireless device; determine a state of the receive buffer of the first wireless device; and encode a block acknowledgment (BA) of the frame, where the BA comprises an indication of the state of the receive buffer.

In Example 42, the subject matter of Example 41 optionally includes where the state of the receiver buffer is one of the following group: an available receiver buffer size, normal, buffer, restricted, or a media access control (MAC) processing throughput state.

In Example 43, the subject matter of any one or more of Examples 41-42 optionally include where the instructions are further configured to cause the wireless device to: determine if there is a risk of the receive buffer overflowing; if there is not the risk of the receive buffer overflowing, determine the state of the receive buffer to be normal, and if there is the risk of the receive buffer overflowing, determine the state of the receive buffer to be restricted or buffer.

In Example 44, the subject matter of any one or more of Examples 41-43 optionally include where the instructions are further configured to cause the wireless device to: encode buffer capacity parameters, the buffer capacity parameters indicating parameters related to the buffer capacity of the first wireless device; and transmit the buffer capacity parameters to the second wireless device.

In Example 45, the subject matter of any one or more of Examples 41-44 optionally include transceiver circuitry coupled to the processing circuitry; and one or more antennas coupled to the transceiver circuitry.

Example 46 is a method performed on a wireless device, the method including: decoding a frame from a second wireless device; determining a state of the receive buffer of the first wireless device; and encoding a block acknowledgment (BA) of the frame, where the BA comprises an indication of the state of the receive buffer.

In Example 47, the subject matter of Example 46 optionally includes where the state of the receiver buffer is one of the following group: an available receiver buffer size, normal, buffer, restricted, or a media access control (MAC) processing throughput state.

In Example 48, the subject matter of any one or more of Examples 46-47 optionally include determining if there is a risk of the receive buffer overflowing; if there is not the risk of the receive buffer overflowing, determining the state of the receive buffer to be normal, and if there is the risk of the receive buffer overflowing, determining the state of the receive buffer to be restricted or buffer.

In Example 49, the subject matter of any one or more of Examples 46-48 optionally include encoding buffer capacity parameters, the buffer capacity parameters indicating parameters related to the buffer capacity of the first wireless device; and transmitting the buffer capacity parameters to the second wireless device.

Example 50 is an apparatus of a wireless device, the apparatus including: means for decoding a frame from a second wireless device; means for determining a state of the receive buffer of the first wireless device; and means for encoding a block acknowledgment (BA) of the frame, where the BA comprises an indication of the state of the receive buffer.

In Example 51, the subject matter of Example 50 optionally includes where the state of the receiver buffer is one of the following group: an available receiver buffer size, normal, buffer, restricted, or a media access control (MAC) processing throughput state.

In Example 52, the subject matter of any one or more of Examples 50-51 optionally include means for determining if there is a risk of the receive buffer overflowing; if there is not the risk of the receive buffer overflowing, means for determining the state of the receive buffer to be normal, and if there is the risk of the receive buffer overflowing, means for determining the state of the receive buffer to be restricted or buffer.

In Example 53, the subject matter of any one or more of Examples 50-52 optionally include means for encoding buffer capacity parameters, the buffer capacity parameters indicating parameters related to the buffer capacity of the first wireless device; and means for transmitting the buffer capacity parameters to the second wireless device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device comprising: memory; and processing circuitry coupled to the memory, the processing circuitry configured to:
    determine based on buffer capacity parameters of a station and a receive buffer state of the station a size, a bandwidth of a subchannel, and a number of spatial streams (NSS) for a frame;
    encode the frame based on the size, a modulation and coding scheme (MCS), the bandwidth of the subchannel, and the NSS; and
    configure the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

2. The apparatus of claim 1, wherein the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station.

3. The apparatus of claim 1, wherein the receive buffer state is one from the following group: normal, restricted, buffered, an indication of a size of available receive buffer, media access control (MAC) limited, and MAC normal.

4. The apparatus of claim 1, wherein the processing circuitry is further configured to:
    determine one or more one of the size, the MCS, the bandwidth of the subchannel, or the NSS for the frame without restrictions, if the receive buffer state indicates a normal state; and
    determine one or more one of the size, the MCS, the bandwidth of the subchannel, or the NSS for the frame with restrictions based on the buffer capacity parameters of the station, if the receive buffer state indicates a restricted state.

5. The apparatus of claim 4, wherein the processing circuitry is further configured to:
    decode a block acknowledgement comprising the receive buffer state from the station, wherein the receive buffer state is restricted or normal.

6. The apparatus of claim 4, wherein the processing circuitry is further configured to:
    decode a block acknowledgement (BA) comprising the receive buffer state from the station, wherein the receive buffer state is buffered state or normal state;
    determine one or more one of the size, the MCS, the bandwidth of the subchannel, or the NSS for the frame without restrictions based on the buffer capacity parameters of the station, if the receive buffer state indicates the normal state; and
    determine one or more one of the size, the MCS, the bandwidth of the subchannel, or the NSS for the frame with restrictions based on the buffer capacity parameters of the station, a time since the BA was received, and a speed freeing rate of the station receive buffer, if the receive butler state indicates the buffered state.

7. The apparatus of claim 4, wherein the processing circuitry is further configured to:

decode a block acknowledgement (BA) comprising the receive buffer state from the station, wherein the receive buffer state indicates an available receiver buffer size; and determine one or more one of the size, the MCS, the bandwidth of the subchannel, or the NSS for the frame with restrictions based on the buffer capacity parameters of the station, a time since the BA was received, and the available receive buffer size.

8. The apparatus of claim 1, wherein the processing circuitry is further configured to:

decode a block acknowledgement (BA) comprising the receive buffer state from the station, wherein the receive buffer state indicates a media access control (MAC) processing throughput state; and determine one or more one of the size, the MCS, the bandwidth of the subchannel, or the NSS for the frame with restrictions based on the buffer capacity parameters of the station and the MAC processing throughput state.

9. The apparatus of claim 8, processing circuitry is further configured to:

decode a second frame comprising the butler capacity parameters indicating two or more MAC processing throughput states that are supported by the station.

10. The apparatus of claim 8, wherein the receive buffer state is indicated in a high-efficiency (HE) field of the physical header of the BA or in a field of the MAC portion of the BA.

11. The apparatus of claim 1, wherein the processing circuitry is further configured to:

receive the buffer capacity parameters from the station.

12. The apparatus of claim 1, wherein the processing circuitry is further configured to:

encode a second frame with proposed buffer capacity parameters for the station;

configure the wireless device to transmit the proposed buffer capacity parameters to the station; and decode a third frame with the buffer capacity parameters, wherein the third frame is received from the station and the buffer capacity parameters are different than the proposed buffer capacity parameters.

13. The apparatus of claim 1, wherein the processing circuitry is further configured to:

decode a block acknowledgment from the station comprising an indication of the receive buffer state.

14. The apparatus of claim 1, wherein the wireless device and the one or more stations are each one from the following group: an Institute of Electrical and Electronic Engineers (IEEE) 802.11ax access point, an IEEE 802.11ax station, an IEEE 802.11 station, and an IEEE 802.11 access point.

15. The apparatus of claim 1, further comprising transceiver circuitry coupled to the processing circuitry.

16. A non-transitory computer-readable storage medium that stores instructions for execution by one or more processors, the instructions to configure the one or more processors to cause a wireless device to:

determine based on buffer capacity parameters of a station and a receive buffer state of the station a size, a bandwidth of a subchannel, and a number of spatial streams (NSS) for a frame;

encode the frame based on the size, a modulation and coding scheme (MCS), the bandwidth of the subchannel, and the NSS; and configure the wireless device to transmit the frame in accordance with the size, the MCS, the bandwidth of the subchannel, the NSS, and one or both of orthogonal frequency division multiple- access (OFDMA) or multi-user multiple-input multiple-output (MU-MIMO).

17. The non-transitory computer-readable storage medium of claim 16, wherein the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MIDU) or MAC service data unit (MSDU) density, a maximum transmission opportunity duration, a total number of packets, limitations regarding timing restrictions, or an indication of available receive buffer resources of the station, and wherein the receive buffer state is one from the following group: normal, restricted, buffered, an indication of a size of available receiver buffer, media access control (MAC) limited, and MAC normal.

18. A method performed by a wireless device, the method comprising:

determining based on buffer capacity parameters of a station and a receive buffer state of the station a size, a bandwidth of a subchannel, and a number of spatial streams (NSS) for a frame;

encoding the frame based on the size, a modulation and coding scheme (MCS), the bandwidth of the subchannel, and the NSS; and configuring the wireless device to transmit the frame in accordance with the size, the MCS, the bandwidth of the subchannel, the NSS, and one or both of orthogonal frequency division multiple-access (OFDMA) or multi-user multiple-input multiple-output (MU-MIMO).

19. The method of claim 18, wherein the buffer capacity parameters comprises one or more from the following group: an indication of how fast a receive buffer of the station is freed, an indication of one or more media access control (MAC) processing throughputs, an indication of a maximum physical (PHY) Layer Convergence Procedure (PLCP) Protocol Data Unit (PPDU) size, a MAC Protocol Data Unit (MPDU) or MAC service data unit (MSDU) density, a maximum transmission opportunity duration, a total number of packets, limitations regarding timing restrictions, or an indication of available receive buffer resources of the station, and wherein the receive buffer state is one from the following group: normal, restricted, buffered, an indication of a size of available receive buffer, media access control (MAC) limited and MAC normal.

20. An apparatus of a first wireless device comprising: memory; and processing circuitry coupled to the memory, the processing circuity configured to:

decode a frame from a second wireless device;

determine a state of the receive buffer of the first wireless device; and encode a block acknowledgment (BA) of the frame, wherein the BA comprises an indication of the state of the receive buffer, wherein the state of the receive buffer is a media access control (MAC) processing throughput state, wherein a value of the MAC processing throughput state indicates a speed by which the first wireless device is capable of freeing available buffers.

21. The apparatus of claim 20, wherein the state of the receive buffer further comprises one of the following group: an available receive buffer size, normal, buffer, or restricted.

22. The apparatus of claim 20, wherein the processing circuitry is further configured to:

determine if there is a risk of the receive buffer overflowing;

if there is not the risk of the receive buffer overflowing, determine the state of the receive buffer to be normal, and if there is the risk of the receive buffer overflowing, determine the state of the receive buffer to be restricted or buffer.

23. The apparatus of claim 20, wherein the processing circuitry is further configured to:

encode buffer capacity parameters, the buffer capacity parameters indicating parameters related to the buffer capacity of the first wireless device; and transmit the buffer capacity parameters to the second wireless device.

* * * * *

UNITED STATES PATENT AND TRADEMARK OFFICE
CERTIFICATE OF CORRECTION

PATENT NO. : 10,182,369 B2  
APPLICATION NO. : 15/197383  
DATED : January 15, 2019  
INVENTOR(S) : Cariou et al.

Page 1 of 1

It is certified that error appears in the above-identified patent and that said Letters Patent is hereby corrected as shown below:

In the Claims

In Column 20, Line 65, in Claim 6, delete "butler" and insert --buffer-- therefor
In Column 21, Line 21, in Claim 9, before "processing", insert --wherein the--
In Column 21, Line 23, in Claim 9, delete "butler" and insert --buffer-- therefor
In Column 22, Line 1, in Claim 16, delete "multiple- access" and insert --multiple-access-- therefor
In Column 22, Line 11, in Claim 17, delete "(MIDU)" and insert --(MPDU)-- therefor
In Column 22, Line 49, in Claim 19, delete "limited" and insert --limited,-- therefor Signed and Sealed this
Twenty-first Day of April, 2020

Andrei Iancu
*Director of the United States Patent and Trademark Office*